(12) United States Patent
Robertson

(10) Patent No.: US 6,170,404 B1
(45) Date of Patent: Jan. 9, 2001

(54) PRESSURE-DRIVEN MAGNETICALLY-COUPLED CONVEYANCE

(75) Inventor: Glen A. Robertson, Harvest, AL (US)

(73) Assignee: The United States of America as represented by the Administrator of the National Aeronautics and Space Administration, Washington, DC (US)

(*) Notice: Under 35 U.S.C. 154(b), the term of this patent shall be extended for 0 days.

(21) Appl. No.: 09/216,492

(22) Filed: Dec. 18, 1998

(51) Int. Cl.[7] ................................................. B61B 13/00
(52) U.S. Cl. ............................................. 104/155; 104/156
(58) Field of Search ................................... 104/155, 156

(56) References Cited

U.S. PATENT DOCUMENTS

| | | | |
|---|---|---|---|
| 2,493,013 | * | 1/1950 | Nelson .................................. 104/155 |
| 2,493,014 | * | 1/1950 | Nelson .................................. 104/155 |
| 2,606,725 | * | 8/1952 | Dreibelbis ............................. 104/155 |
| 2,856,139 | * | 10/1958 | Lockwood ............................ 104/155 |
| 4,240,599 | * | 12/1980 | Hammond ............................ 104/155 |
| 4,347,791 | * | 9/1982 | Mandros ............................... 104/156 |
| 4,645,182 | * | 2/1987 | Stoll ...................................... 104/156 |
| 4,805,761 | * | 2/1989 | Totsch .................................. 104/155 |

* cited by examiner

Primary Examiner—Sherman Basinger
Assistant Examiner—Lars A. Olson
(74) Attorney, Agent, or Firm—Jerry L. Seemann

(57) ABSTRACT

This invention has the ability to provide the initial acceleration necessary for spacecraft to attain earth orbit without use of traditional rocket propellants. The invention also has the ability to provide an alternative means of ground transportation without the direct use of fossil fuel. The invention utilizes a pressurized, nonmagnetic tube to accelerate and translate a piston. The piston is magnetically coupled to a conveyance, which travels along the outside of the tube. The conveyance, in turn, can be either a spacecraft or a vehicle suitable for ground transportation.

14 Claims, 4 Drawing Sheets

PRESSURE-DRIVEN MAGNETICALLY-COUPLED CONVEYANCE

Origin of the Invention

The invention described in this patent was made by an employee of the United States Government and may be manufactured and used by or for the Government for governmental purposes without the payment of any royalties.

BACKGROUND OF THE INVENTION

1. Field of the Invention

In general, this invention pertains to transportation systems. Specifically, this invention pertains to propulsion systems necessary for both space travel and ground transportation.

2. Background Information

The abundance and usefulness of pneumatic devices is unequivocal. In particular, gas guns, which use pressurized gas to accelerate projectiles, are well known. However, gas guns probably work better and are simply more practical on a small scale (i.e., with small bullet-sized projectiles) than on a large scale (i.e., with large spacecraft-sized projectiles). Consequently, the design and operation of a gas gun that could be used for spacecraft would be very unwieldy. The present invention utilizes the small-scale scale gas gun concept in combination with a magnetic coupling scheme to achieve a novel apparatus for propelling large conveyances like spacecraft and ground transportation vehicles.

SUMMARY OF THE INVENTION

This invention has the ability to provide the initial acceleration necessary for spacecraft to attain earth orbit without use of traditional rocket propellants. The invention also has the ability to provide an alternative means of ground transportation without the direct use of fossil fuel. The invention utilizes a pressurized, nonmagnetic tube to accelerate and translate a piston. The piston is magnetically coupled to a conveyance, which travels along the outside of the tube. The conveyance, in turn, can be either a spacecraft or a vehicle suitable for ground transportation.

An object of this invention is to provide initial acceleration from the earth's surface that is needed for space travel.

Another object of this invention is to reduce the weight of propellant that is needed by launch vehicles to reach earth orbit.

A further object of this invention is to provide low cost access to space.

A still further object of this invention is to provide a more environmentally-friendly mechanism for propelling transportation vehicles on the ground.

BRIEF DESCRIPTION OF THE DRAWINGS

The following discussion of the invention will refer to the accompanying drawings in which.

DESCRIPTION OF THE PREFERRED EMBODIMENT

Figure 1:
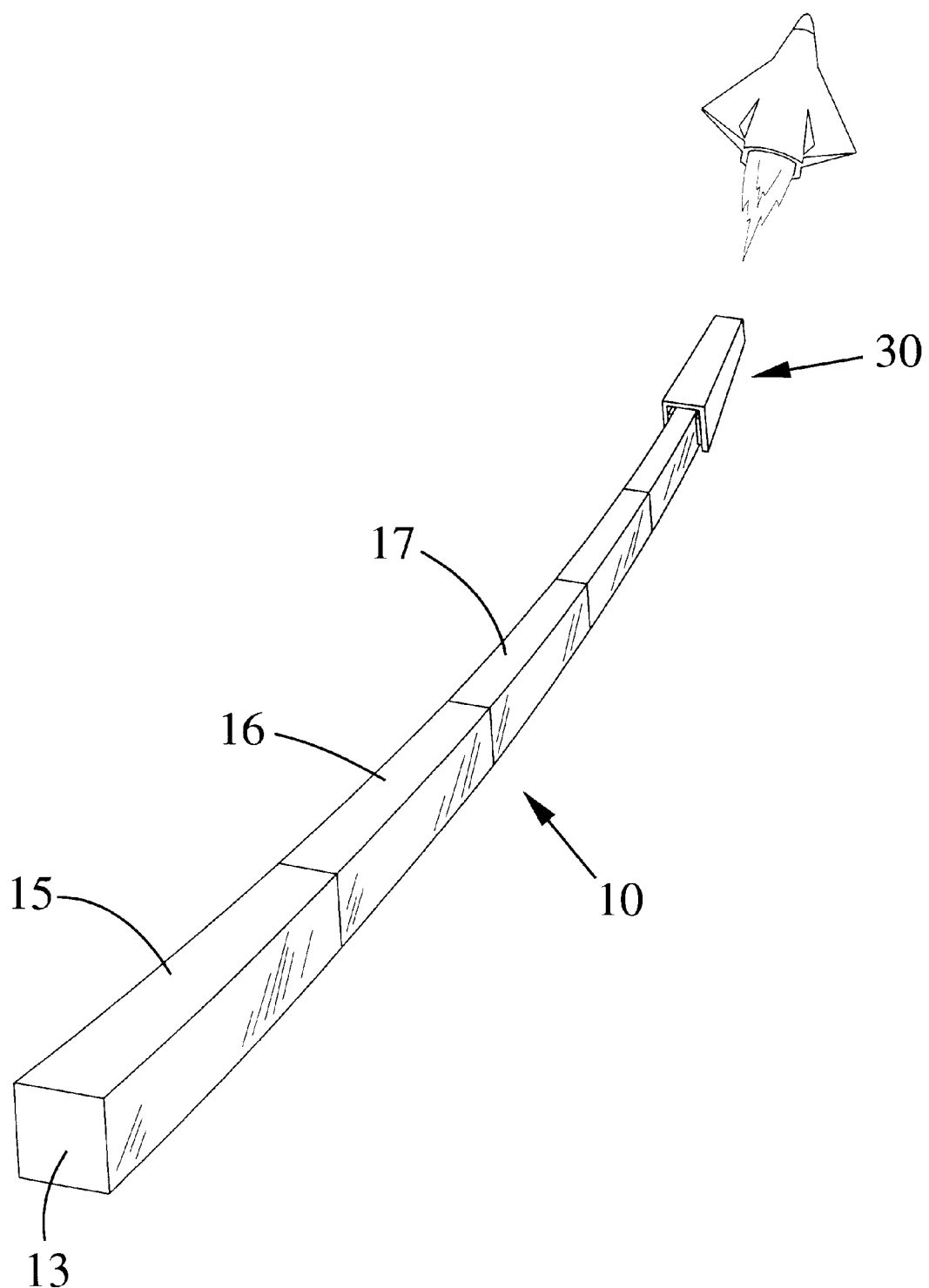
FIG. 1 represents a perspective view of the pressure-driven, magnetically-coupled conveyance.
Figure 2:
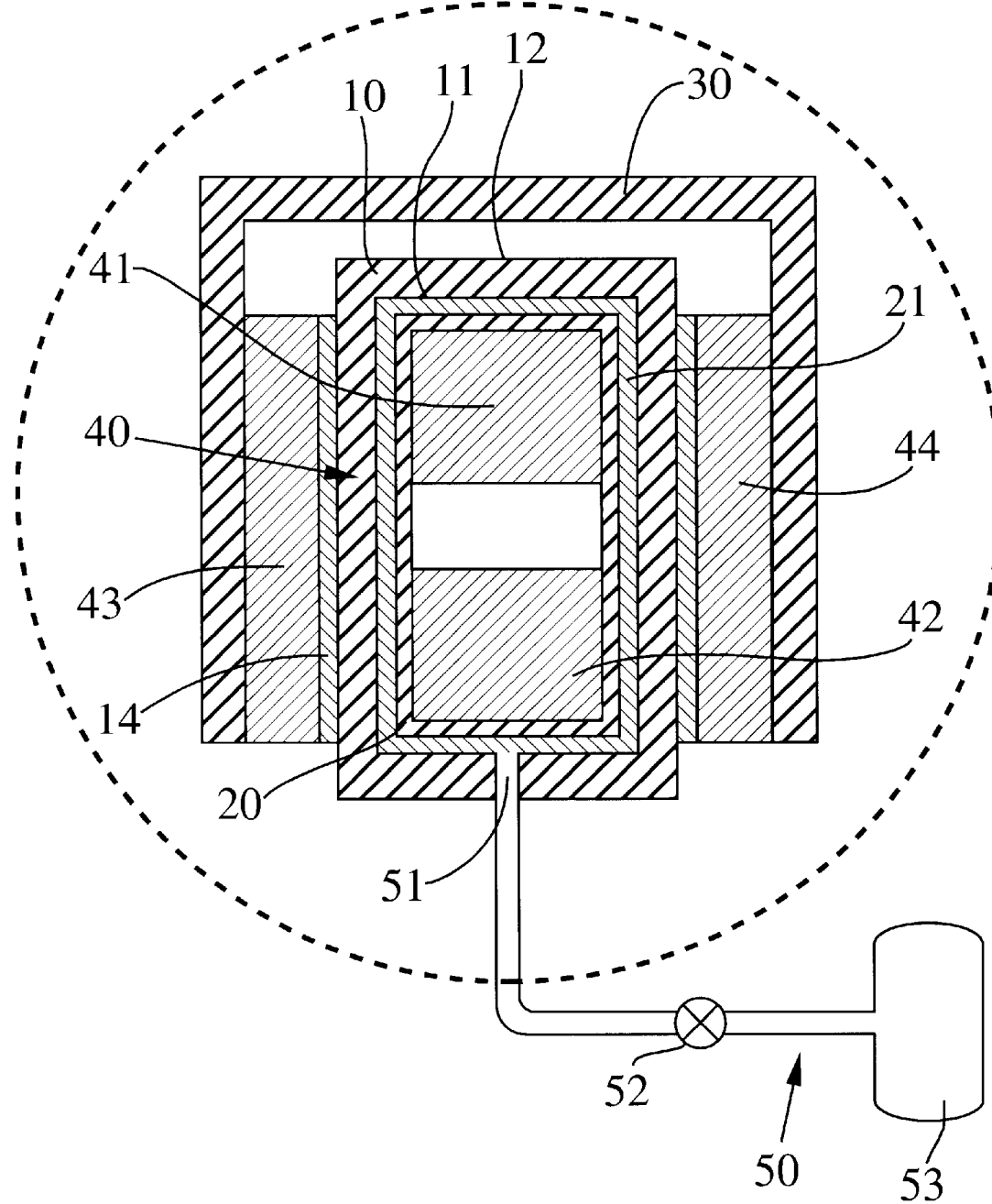
FIG. 2 represents a cross-sectional view of the pressure-driven, magnetically-coupled conveyance.

Referring to FIGS. 1 and 2, a preferred embodiment of this invention comprises a nonmagnetic tube (10), a piston (20), a conveyance (30), a magnetic coupling (40), and a means for pressurizing (50) the nonmagnetic tube. The nonmagnetic tube (10) has an interior surface (11), an exterior track surface (12), and a closed end (13). The piston (20) is located within the nonmagnetic tube (10) and is sealed against the interior surface (11) of the tube (10). The conveyance (30) is mounted to the exterior track surface (12) of the nonmagnetic tube (10) with the magnetic coupling (40) and is movable along the tube (10).

In the preferred embodiment, the magnetic coupling (40) consists of a first magnetic element (41) and a second magnetic element (42) mounted on the piston (20) and a third magnetic element (43) and a fourth magnetic element (44) mounted on the conveyance (30). Obviously, there are multiple configurations that would create the magnetic coupling (40). As a first example, the first and second magnetic elements (41, 42) could be magnets and the third and fourth magnetic elements (43, 44) could be magnetic plates. As a second example, the first and second magnetic elements (41, 42) could be magnetic plates and the third and fourth magnetic elements (43, 44) could be magnets. As a third example, all four magnetic elements (41, 42, 43, 44) could be magnets. While the magnetic elements could be permanent magnets, electromagnets are preferred because their associated magnetic field can be controlled with electrical current. Thus, with electromagnets, the magnetic coupling (40) can be precisely monitored and controlled.

The means for pressurizing (50) the nonmagnetic tube (10) can be accomplished with an injection port (51) strategically placed in the nonmagnetic tube (10) between the closed end (13) and the piston (20). In addition, the means for pressurizing (50) includes a regulator (52) for controlling fluid flow and a holding tank (53) for storing the fluid that will be used to pressurize the nonmagnetic tube (10).

The preferred embodiment may also include a piston gasket (21) for sealing the piston (20) to the nonmagnetic tube (10). In addition, the preferred embodiment may include a skid plate (14) attached to the exterior track surface (12) for controlling friction between the nonmagnetic tube (10) and the conveyance (30).

In an alternative embodiment, the nonmagnetic tube (10) is divided into a plurality of sections (15, 16, and 17 of FIG. 1) that can be individually and consecutively pressurized. Such an embodiment would have application where long tube lengths are needed to reach requisite launch velocities for spacecraft or to travel long distances on the ground.

Operation of this invention is straightforward. Fluid pressure is introduced into the nonmagnetic tube in a controlled manner in order to accelerate the piston to a desired velocity. If the nonmagnetic tube has more than one section, the previous section is isolated or closed off as the piston travels into the next section. This keeps pressurized tube volume to a minimum. After reaching the desired velocity, at least two outcomes are possible depending on the function of the conveyance. First, if the conveyance is a spacecraft, the magnetic coupling is simply deactivated and the spacecraft continues to travel under its own power. Second, if the conveyance is a ground transportation vehicle, the tube pressure is regulated to maintain the desired velocity.

Figure 3:
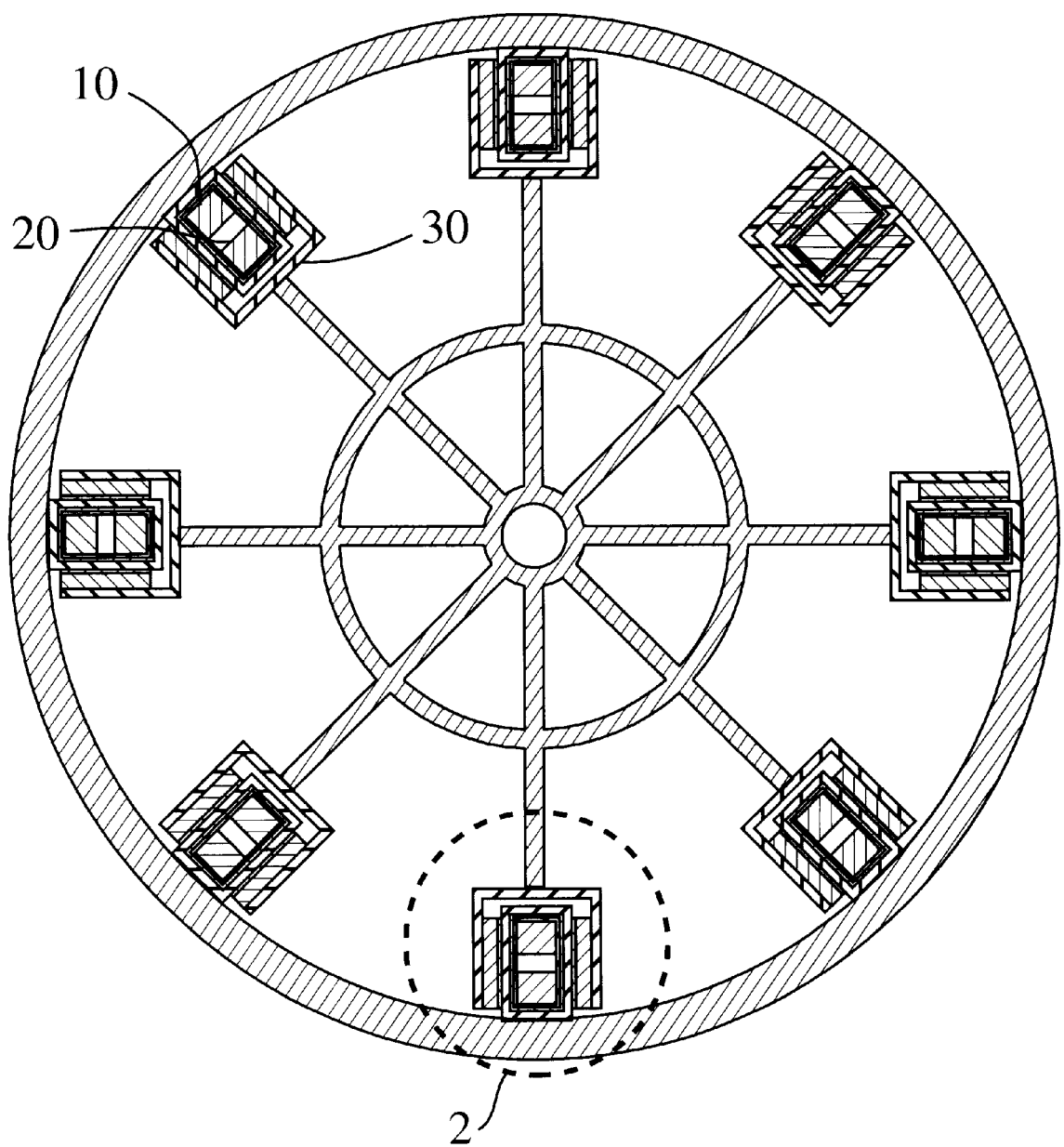
FIG. 3 represents a cross-sectional view demonstrating how the invention could be used in a launch configuration for accelerating spacecraft.

For large conveyances, multiple tubes can be combined to achieve a desired result. For example, in FIG. 3, the conveyance is supported by 8 tubes in a circular arrangement.

Figure 4:
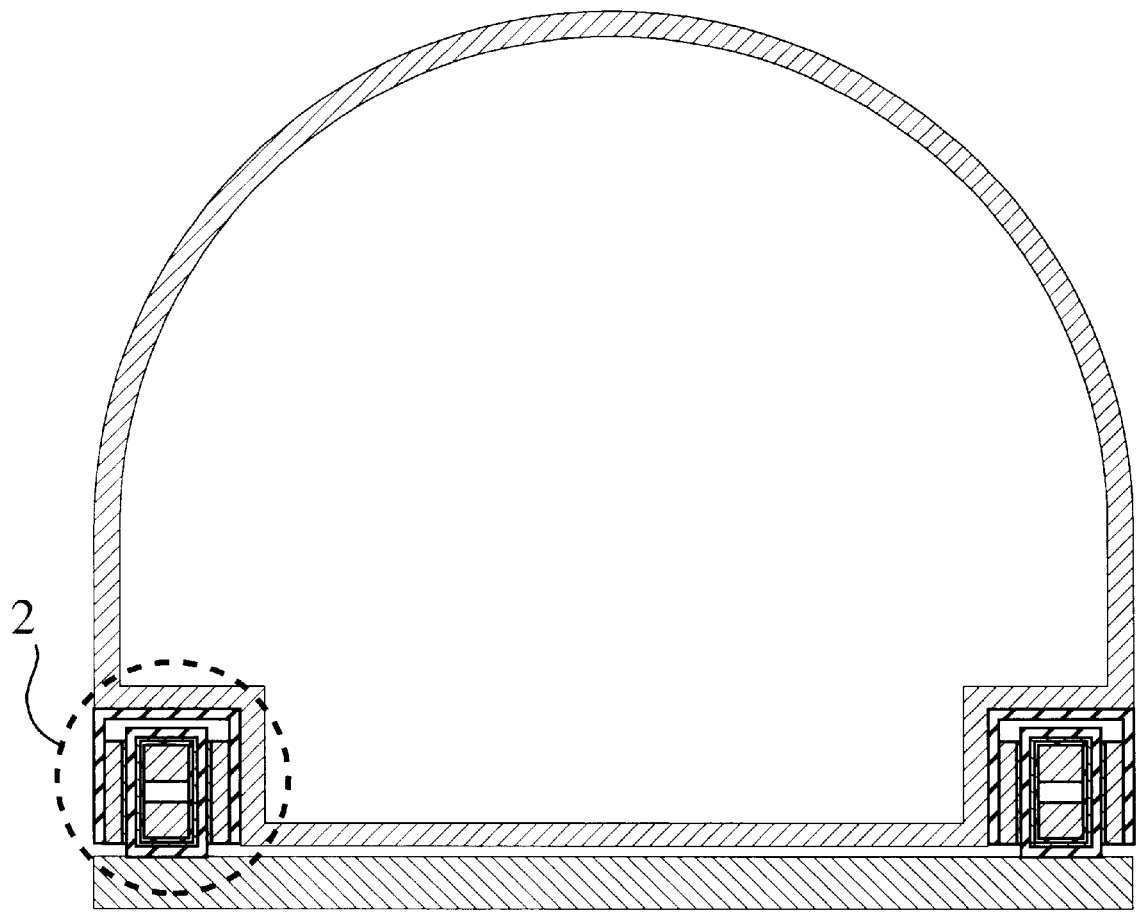
FIG. 4 represents a cross-sectional view demonstrating how the invention could be used in a ground transportation system.

Such an arrangement can function as a catapult for launching spacecraft from a tunnel or another tubular enclosure. In FIG. 4, the conveyance is shown as a train supported by 2 tubes arranged like railroad tracks. Thus, the invention is very flexible in its application.

What is claimed is:

1. An apparatus, comprising:
   a nonmagnetic tube, said nonmagnetic tube having an interior surface and an exterior track surface, said nonmagnetic tube also having a closed end;
   a piston, said piston is located within said tube and is sealed against said interior surface of said tube, said piston also having a first magnet;
   a conveyance, said conveyance having a first magnetic plate such that said conveyance is magnetically coupled to said piston and movable along said exterior track surface of said tube; and
   means for pressurizing said nonmagnetic tube whereby said piston translates along said nonmagnetic tube and carries said magnetically-coupled conveyance.

2. An apparatus as recited in claim 1, wherein said piston has a second magnet.

3. An apparatus as recited in claim 1, wherein said conveyance has a second magnetic plate.

4. An apparatus as recited in claim 1, wherein said nonmagnetic tube further has a plurality of pressurizable sections that can be individually and consecutively pressurized.

5. An apparatus as recited in claim 1, wherein in said means for pressurizing said nonmagnetic tube, comprises:
   an injection port located in said nonmagnetic tube between said closed end and said piston;
   a regulator for controlling fluid flow; and
   a holding tank for storing fluid.

6. An apparatus as recited in claim 1, further comprising a piston gasket attached to said piston.

7. An apparatus as recited in claim 1, further comprising a skid plate attached to said exterior track surface of said nonmagnetic tube.

8. An apparatus, comprising:
   a nonmagnetic tube, said nonmagnetic tube having an interior surface and an exterior track surface, said nonmagnetic tube also having a closed end;
   a piston, said piston is located within said tube and is sealed against said interior surface of said tube, said piston also having a first magnetic plate;
   a conveyance, said conveyance having a first magnet such that said conveyance is magnetically coupled to said piston and movable along said exterior track surface of said tube; and
   means for pressurizing said nonmagnetic tube whereby said piston translates along said nonmagnetic tube and carries said magnetically-coupled conveyance.

9. An apparatus as recited in claim 8, wherein said piston has a second magnetic plate.

10. An apparatus as recited in claim 8, wherein said conveyance has a second magnet.

11. An apparatus as recited in claim 8, wherein said nonmagnetic tube further has a plurality of pressurizable sections that can be individually and consecutively pressurized.

12. An apparatus as recited in claim 8, wherein in said means for pressurizing said nonmagnetic tube, comprises:
   an injection port located in said nonmagnetic tube between said closed end and said piston;
   a regulator for controlling fluid flow; and
   a holding tank for storing fluid.

13. An apparatus as recited in claim 8, further comprising a piston gasket attached to said piston.

14. An apparatus as recited in claim 8, further comprising a skid plate attached to said exterior track surface of said nonmagnetic tube.

* * * * *